United States Patent Office 3,459,748
Patented Aug. 5, 1969

3,459,748
HYDROXYALKYLENE-SUBSTITUTED BENZ-
OXAZINES AND BENZOTHIAZINES
John Krapcho, Somerset, N.J., assignor to E. R. Squibb
& Sons, Inc., New York, N.Y., a corporation of
Delaware
No Drawing. Filed Apr. 28, 1967, Ser. No. 634,492
Int. Cl. C07d *93/08, 87/16;* A61k *27/00*
U.S. Cl. 260—243                                    6 Claims

ABSTRACT OF THE DISCLOSURE

Compounds having the formula

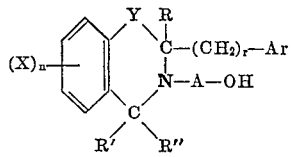

and optical isomers thereof, wherein Ar is $(X^1)_n$-substituted aryl; R is selected from the group consisting of hydrogen, lower alkyl and $(X^2)_n$-substituted aryl; R' and R" taken separately are both hydrogen; R' and R" taken together is oxo; Y is selected from the group consisting of O, S, sulfone ($SO_2$) and sulfoxide (SO); X, $X^1$ and $X^2$ may be the same or different and are selected from the group consisting of hydrogen, lower alkyl, lower alkoxy, amino, di(lower alkyl)amino, halo, lower alkylthio, hydroxy, cyano, nitro and trifluoromethyl; $n$ is an integer from one to three; $r$ is an integer from zero to three; and A is lower alkylene. These compounds are useful as intermediates in the preparation of basically-substituted benzoxazines and benzothiazines which in turn possess central nervous system modifying activity (e.g., as depressants which are useful as tranquilizers) and which have also been found to possess antibacterial activity.

---

This application relates to novel intermediates for the preparation of therapeutically active chemical compounds, which intermediates also possess valuable therapeutic properties in their own way.

The therapeutically active compounds prepared through the novel intermediates of this invention have the general formula

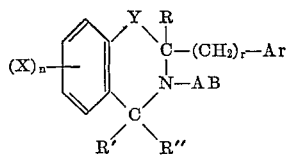

wherein the various variables are as set forth in the detailed description below.

The novel intermediates of this invention have the general formula

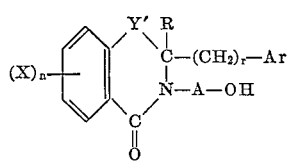

wherein the variables are as set forth below.

The final products and novel intermediates of this invention possess central nervous system modifying activity (e.g., as depressants which are useful as tranffuilizers). The final products and novel intermediates of this invention have also been found to possess antibacterial activity.

Detailed description

This invention relates to novel intermediates in the preparation of: chemical compounds having valuable therapeutic properties.

The therapeutically active compounds prepared through the novel intermediates of this invention are described in detail in applicant's U.S. application No. 582,522, filed Sept. 28, 1966, and have the general formula I) 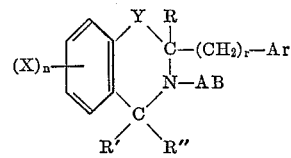

and optical isomers and salts thereof, wherein Ar is $(X^1)_n$-substituted aryl; R is selected from the group consisting of hydrogen, lower alkyl and $(X^2)_n$-substituted aryl; R' and R", taken separately, are both hydrogen; R' and R", taken together, is oxo; Y is selected from the group consisting of O, S, sulfone ($SO_2$) and sulfoxide (SO); X, $X^1$ and $X^2$ may be the same or different and are selected from the group consisting of hydrogen, lower alkyl, lower alkoxy, amino, di(lower alkyl)-amino, halo, lower alkylthio (e.g., $CH_3CH_2CH_2S$—), hydroxy, cyano, nitro and trifluoromethyl; $n$ is an integer from one to three; $r$ is an integer from 0 to 3; A is lower alkylene; and B is a basic nitrogen-containing radical.

Among the suitable radicals represented by the symbol B are amino, (lower alkyl)amino, such as methyl amino, ethyl amino and the like, di(lower alkyl)amino, such as dimethyl amino, diethyl amino and the like, (hydroxy-lower alkyl)amino, such as hydroxyethylamino and the like, di(hydroxy-lower alkyl)amino, such as di(hydroxyethyl)amino and the like, (phenyl-lower alkyl)-amino such as benzyl amino, phenethyl amino and the like, (lower alkyl), (phenyl-lower alkyl)amino, and saturated nitrogen heterocyclics having 5 to 7 atoms in the ring and which may have one additional hetero atom in the ring. A substituent may also be attached to the nitrogen heterocyclic.

Heterocyclics represented by B are those having the formula

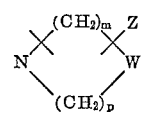

in which W represents NZ', $CH_2$, O or S, $m$ represents an integer from 1 to 4, $p$ represents an integer from 0 to 3, the total of $m+p$ being less than 7, Z represents hydrogen, lower alkyl and lower alkoxy, and Z' represents hydrogen, lower alkyl, lower alkoxy, hydroxy-lower alkyl, alkanoyloxy-lower alkyl, alkanoyloxy-lower alkoxy lower alkyl, hydroxy-lower alkoxy-lower alkyl, di(lower alkyl) amino-lower alkyl, di(lower alkyl)amino-lower alkoxy-lower alkyl, allyl, propargyl, cycloalkyl, cycloalkyl-lower alkyl, X-substituted phenyl, X-substituted phenyl-lower alkyl, and X-substituted phenyl-lower alkenyl (e.g., p-chlorocinnamyl). These may be exemplified by piperidyl [i.e., piperidino, 2-piperidyl, 3-piperidyl and 4-piperidyl]; (lower alkyl)piperidyl [e.g., 2,3 or 4-(lower alkyl)piperidino or 2,3 or 4-(N-lower alkyl)piperidyl; or 2,3 or 4-(N-lower alkyl-2,3 or 4-(lower alkyl)piperidyl]; hydroxy piperidyl, such as hydroxy piperidino;
(lower alkoxy)piperidyl;
pyrrolidyl;
(lower alkyl)pyrrolidyl;
(lower alkoxy)pyrrolidyl;
morpholino;

(lower alkyl)morpholino;
di(lower alkyl)morpholino;
(lower alkoxy)morpholino;
thiamorpholino;
(lower alkyl)thiamorpholino;
di(lower alkyl)thiamorpholino;
(lower alkoxy)thiamorpholino;
piperazyl;
(lower alkyl)piperazyl (e.g., $N^4$-methylpiperazino);
di(lower alkyl)piperazyl;
(lower alkoxy)piperazyl;
(hydroxy-lower alkyl)piperazyl [e.g., $N^4$-(2-hydroxyethyl)piperazino];
alkanoyloxy lower alkyl piperazyl [e.g., $N^4$-(2-acetoxyethyl)piperazino, $N^4$-(2-heptanoyloxyethyl) piperazino, $N^4$-(2-dodecanoyloxyethyl)piperazino];
(hydroxy-lower alkoxy-lower alkyl)piperazyl [e.g., $N^4$-(2-hydroxyethoxyethyl)piperazino];
di(lower alkyl)amino-(lower alkyl)piperazyl [e.g., $N^4$-dimethylaminoethylpiperazino];
di(lower alkyl)amino-(lower alkoxy-lower alkyl)piperazyl [e.g., $N^4$-(2-dimethylaminoethoxyethyl)piperazino];
aryl piperazino [e.g., $N^4$-(o-methoxyphenyl)piperazino] and
homopiperazyl and substituted homopiperazyl [e.g., $N^4$-ethylhomopiperazino, $N^4$-benzylhomopiperazino, $N^4$-(p-hydroxyphenyl)homopiperazino, $N^4$-(o-acetoxybenzyl) homopiperazino and $N^4$-(hydroxyethyl)homopiperazino].

The terms "lower alkyl," "lower alkoxy," and "lower alkylene" as employed herein, include both straight and branched chain radicals of less than eight carbon atoms. The term "alkanoyloxy" includes radicals of up to 14 carbon atoms.

The term "aryl" as employed herein includes mononuclear and dinuclear radicals such as phenyl, substituted phenyl (including 3,4-methylenedioxyphenyl and 3,4-ethylenedioxyphenyl), furyl, thienyl, naphthyl or pyridyl.

It is readily apparent from the above that it is intended that the linkage between the heterocyclic radical B and the alkylene radical A may be through any carbon or nitrogen atom in the heterocyclic ring, and that Z may be linked to any position on the ring having a replaceable hydrogen atom.

Also contemplated are salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methylsulfonic, ethanesulfinic, acetic, propionic, tartaric, salicyclic, citric, gluonic, lactic, malic, mandelic, cinnamic, citraconic, aspartic, stearic, palmitic, itaconic glycolic, p-aminobenzoic, glutamic, benzenesulfonic, cyclohexanesulfamic and theophylline acetic acids as well as with 8-halo-theophyllines, for example, 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well known to the art. Also included within the purview of this invention are the non-toxic quaternary ammonium salts which include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

The particularly preferred compounds prepared through the intermediates of this invention are those wherein Y is sulfur, X and X' are hydrogen, R is hydrogen or lower alkyl, R' and R" are taken together as oxo, and —AB represents a di(lower alkyl)-amino lower alkyl radical.

The compounds of this invention may be prepared by reacting an aldehyde or ketone of the formula (II) 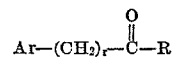

wherein R, Ar, n and r are as hereinabove defined with an amino-alcohol of the formula (III)         $H_2N—A—OH$ wherein A is as hereinabove defined, to produce an intermediate of the formula (IV) 

The compound of Formula IV is then reacted with a thiosalicylic acid, salicylic acid or an ester thereof having the formula (V) 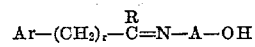

wherein R, X and n are as hereinbefore defined; any Y' is O or S, to yield products of this invention having the formula (VI) 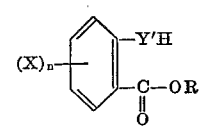

wherein R, X, Ar, Y', A, r and n are as defined hereinabove.

The compounds of Formula VI are treated with a reagent such as thionyl chloride or phosphorous pentachloride to yield an intermediate having the formula (VII) 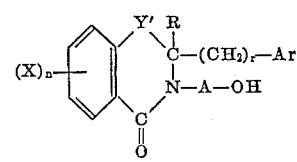

which in turn is reacted with a compound of the formula B—H preferably in the presence of sodium iodide, wherein B is as hereinbefore defined to yield products in accordance with Formula I.

Alternatively, compounds in accordance with Formula VI may be esterified with reagents such as tosyl chloride. The resulting tosyl ester may then be reacted with a compound of the formula B—H to yield products of this invention in accordance with Formula I.

Further, compounds in accordance with Formula I may be prepared by reacting a compound of the formula (VIII) 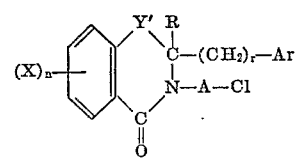

with a haloalcohol of the formula (IX)         Hal—A—OH to yield compounds in accordance with Formula VI, which may then be reacted as set forth above to yield products in accordance with this invention.

The compounds of Formula VI may additionally be reduced by treatment in the presence of a reducing agent such as lithium aluminum hydride or diborane to produce products of this invention of the formula (X)

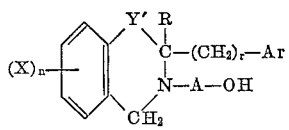

wherein X, Ar, R, Y′, A, B, r and n are as hereinbefore defined.

The corresponding sulfone and sulfoxide derivatives of the compounds of Formulae VI or VII may be prepared by oxidizing compounds of Formulas VI or VII wherein Y′ represents S with potassium permanganate or hydrogen peroxide.

Examples of aldehyde and ketone starting materials in accordance with Formula II are:

benzaldehyde,
4-methoxybenzaldehyde,
2-nitrobenzaldehyde,
3-propylthiobenzaldehyde,
3-trifluoromethylbenzaldehyde,
2,4-dimethoxybenzaldehyde,
2-methoxy-4-trifluoromethylbenzaldehyde,
phenylpropionaldehyde,
3,4-dimethylbenzaldehyde,
benzophenone,
4-chlorobenzophenone,
2,3-dimethoxypropiophenone,
4-trifluoromethylbutyrophenone,
2-chlorocaprophenone,
2-nitropropiophenone,
3-aminoacetophenone,
desoxybenzoin,
4-methoxy-β-(4-methoxyphenyl)propiophenone and the like.

Examples of compounds in accordance with Formula V are:

thiosalicylic acid,
5-ethylthiosalicylic acid,
5-trifluoromethylthiosalicylic acid,
4-cyanothiosalicylic acid,
4-ethylthiothiosalicylic acid,
5-dimethylaminothiosalicylic acid,
salicylic acid,
4-methoxysalicylic acid,
3-aminosalicylic acid,
4-hydroxysalicylic acid and the like.

The compounds of this invention may be obtained as mixtures of optical isomers. Those which contain a basic group in the molecule may be resolved into the optically active d- and l-forms according to procedures known for the resolution of racemic compounds. For example, use of d-tartaric acid, dibenzoyl-d-tartaric acid, l-malic acid, d-camphorsulfonic acid, and so forth.

Compounds prepared through the intermediates of this invention and the salts thereof as well as intermediates in accordance with Formulas VI and VII and the sulfones and sulfoxides thereof, possess central nervous system modifying activity (e.g., as depressants which are useful as tranquilizers). They may be administered orally or parenterally in the form of tablets, capsules, elixirs, injectables, or the like, by incorporating the appropriate dosage of the compound of Formula I or a physiologically acceptable salt thereof in a dosage range similar to that used with chlordiazepoxide, for instance, about 0.1 to about 20 mg./kg. of body weight per day.

The above compounds have also been found to possess antibacterial activity, and hence may be employed as disinfectants against various staphylococci. For this purpose, they are dissolved or suspended in water, preferably also containing a detergent, at a concentration of about 0.5% to about 10%, and may be used as washes to disinfect floors, walls, tables and the like.

The following examples illustrate the invention. All temperatures are in degrees centigrade unless otherwise stated:

Example 1.—N-benzylidene-3-aminopropanol

A solution of 75.1 g. of 3-aminopropanol and 106 g. of benzaldehyde in 150 ml. of benzene is refluxed for 2 hours (an aqueous phase is collected in a Dean-Stark tube). The solvent is evaporated and the residue fractionated to give 151.9 g. of colorless product, B.P. 127–128° (2 mm.).

Example 2.—2,3-dihydro-3-(3-hydroxypropyl)-2-phenyl-4H-1,3-benzothiazin-4-one

A suspension of 86.0 g. of thiosalicylic acid in 400 ml. of xylene is treated with a solution of 87.0 g. of the product of Example 1 in 300 ml. of xylene. The mixture is stirred and refluxed for 3 hours, cooled and treated with 200 ml. of water. The aqueous phase is discarded and the organic phase diluted with 300 ml. of chloroform to prevent crystallization of the product. This organic phase is washed with 100 ml. of 5% sodium bicarbonate (three times), 100 ml. of water and dried over magnesium sulfate. After evaporation of the bulk of the solvent under reduced pressure, the residue begins to crystallize, is diluted with 400 ml. of hexane and cooled to give 100 g. of yellow-orange solid, M.P. 117–125°. Recrystallization from 100 ml. of acetonitrile gives 90.4 g. of nearly colorless solid, M.P. 124–126°. After another crystallization from 100 ml. of acetonitrile, the nearly colorless material weighs 84.6 g., M.P. 125–127°. Part of this material (15 g.) is crystallized from 50 ml. of isopropyl alcohol to give 13.5 g. of colorless solid, M.P. 125–127°.

Example 3.—3-(3-chloropropyl)-2,3-dihydro-2-phenyl-4H-1,3-benzothiazin-4-one

A suspension of 30.0 g. of 2,3-dihydro-3-(3-hydroxypropyl)-4H-1,3-benzothiazin-4-one from Example 2 in 100 ml. of chloroform is treated portionwise with 80 ml. of thionyl chloride and the resulting mixture is refluxed for 3 hours. About 100 ml. of distillate is collected at atmospheric pressure and the residue then concentrated at reduced pressure to give a yellow granular solid. The latter is suspended in 100 ml. of hexane, cooled and filtered to give 30.3 g. of nearly colorless product, M.P. 134–136°.

Example 4.—3-[3-(dimethylamino)propyl]-2,3-dihydro-2-phenyl-4H-1,3-benzothiazin-4-one, hydrochloride A solution of 14.0 grams of sodium iodide in 100 cc. of acetone is admixed with a solution of 28.6 grams of the product of Example 3 dissolved in 200 cc. of acetone, and the mixture refluxed for 3 hours. The solvent is removed under reduced pressure, the residue treated with 200 cc. of benzene and then with a cold solution of 48.0 g. of dimethylamine in 200 ml. of benzene. This mixture is allowed to stand overnight at room temperature, after which it is refluxed for 3 hours, cooled and treated with a solution of 4.0 g. of sodium hydroxide in 50 cc. of water. The organic layer is separated, dried over magnesium sulfate, filtered, and the solvent evaporated to give 30.8 g. of the light brown base, M.P. 90–97°. After digestion with 100 ml. of hexane, the pale brown product weighs 28.4 g., M.P. 92–98°.

A colorless analytical sample is obtained by crystallization from acetonitrile, M.P. 98–100°.

Part of the above base (27.5 g.) is dissolved in 50 ml. of warm ethanol, cooled and treated with 14 ml. of 6.0 N Alc. HCl. The resulting solution is diluted to 600 ml. with ether to give 28.3 g. of pale brown solid, M.P. 202—204°. After crystallization from 130 ml. of acetonitrile, the nearly colorless solid weighs 26.2 g., M.P. 206–208°. This material is recrystallized from 350 ml. of acetonitrile (Darco-treated) to give 21.8 g. of colorless product, M.P. 206–208°.

Example 5.—2,3-dihydro-3-[3-(4-methyl-1 - piperazinyl) propyl]-2-phenyl-4H-1,3-benzothiazin-4 - one, dihydrochloride To a solution of 30.0 g. of the above alcohol in 100 ml. of chloroform is added a solution of 9.0 g. of pyridine in 100 ml. of chloroform. This solution is cooled to 0°, treated dropwise (15 minutes) with a solution of 19.1 g. of tosyl chloride and allowed to stand overnight at room temperature. The solution is extracted with 100 ml. of cold water (twice), 100 ml. of 5% sodium bicarbonate (twice), 50 ml. of water, 50 ml. of 10% hydrochloric acid (twice), 50 ml. of water, dried over magnesium sulfate and the solvent evaporated to give 47.2 g. of the intermediate tosylate as a pale yellow syrup.

A solution of this material in 200 ml. of toluene is treated with a solution of 20.0 g. of N-methylpiperazine and the mixture refluxed for 5 hours. The mixture is cooled, extracted with a solution of 30 ml. of concentrated hydrochloric acid in 300 ml. of water and the aqueous phase treated portionwise with 100 g. of potassium carbonate. The liberated base is extracted with 300 ml. of ether (three times), the combined extracts washed with 50 ml. of water, dried over magnesium sulfate and the solvent evaporated. The residue is dissolved in 300 ml. of ether, extracted with 50 ml. of water (twice), dried over magnesium sulfate and the solvent evaporated to give the free base. This material is dissolved in 50 ml. of ethanol, treated with 8.0 ml. of 6.0 N Alc. HCl and the bulk of the solvent is evaporated on a rotary evaporator to give a crystalline product, M.P. 150–220°. Crystallization from 40 ml. of ethanol gives a colorless material (solvate), M.P. 150–220°.

The bulk of this material is added to 100 ml. of hot acetonitrile, the solid dissolved and then rapidly crystallized. After cooling, the material is filtered to give a colorless product, M.P. 248–250° (dec.).

Example 6.—2,3-dihydro-3-(3-hydroxypropyl)-2-phenyl-7-methoxy-4H-1,3-benzothiazin-4-one Following the procedure of Example 2 but substituting equivalent amounts of 4-methoxysalicylic acid for the thiosalicylic acid, there is obtained the desired product.

Example 7.—2,3-dihydro-3-(3-hydroxypropyl)-2 - propyl-2-m-dimethyl-aminophenyl-5-ethyl - 4H - 1,3 - benzothiazin-4-one Following the procedures of Examples 1 and 2 but substituting equivalent amounts of m-dimethylaminobutyrophenone for the benzaldehyde, and 6-ethylthiosalicylic acid for the thiosalicylic acid, the desired product is obtained.

Example 8.—2,3-dihydro-3-(3-hydroxypropyl)-2-pentyl-2-p-methoxyphenyl-4H-1,3-benzothiazine-4-one Following the procedure of Examples 1 and 2 but substituting an equivalent amount of 4-methoxycaprophenone for the benzaldehyde the desired product is obtained.

Example 9.—2,3-dihydro-3-(3-hydroxypropyl)-2-phenyl-6-trifluoromethyl-4H-1,3-benzothiazine-4-one Following the procedure of Example 2 but substituting an equivalent amount of 5-trifluoromethyl thiosalicylic acid for the thiosalicylic acid, there is obtained the desired product.

Example 10.—2,3-dihydro-3-(3-hydroxypropyl)-2-o-trifluoromethylphenyl-4H-1,3-benzoxazine-4-one Following the procedure of Examples 1 and 2 but substituting equivalent amounts of o-trifluoromethylbenzaldehyde for the benzaldehyde, and salicylic acid for the thiosalicylic acid, the desired product is obtained.

Example 11.—2,3-dihydro-3-(3-hydroxypropyl)-2-p-aminophenyl-6-nitro-4H-1,3-benzothiazin-4-one Following the procedure of Examples 1 and 2 but substituting equivalent amounts of p-aminobenzaldehyde for the benzaldehyde and 5-nitrothiosalicylic acid for the thiosalicylic acid, there is obtained the desired product.

Example 12.—2,3-dihydro-3-(3-hydroxypropyl)-2-phenethyl-4H-1,3-benzothiazin-4-one Following the procedure of Examples 1 and 2 but substituting an equivalent amount of phenylpropionaldehyde for the benzaldehyde, the desired product is obtained.

Example 13.—2,3-dihydro-3-(3-hydroxypropyl)-2-(2-pyridyl)-4H-1,3-benzothiazin-4-one Following the procedure of Examples 1 and 2 but substituting an equivalent amount of 2-pyridine aldehyde for the benzaldehyde, the desired product is obtained.

Example 14.—2,3-dihydro-3-(3-hydroxypropyl)-2-phenyl-4H-1,3-benzothiazin-4-one, dioxide By treatment of the product of Example 2 with excess hydrogen peroxide in the presence of acetic acid, the desired product is obtained.

Example 15.—2,3-dihydro-3-(2-hydroxyethyl)-2-phenyl-4H-1,3-benzoxazin-4-one

To a mixture of 2.4 g. of sodium hydride in 200 ml. of dimethylformamide is added 22.5 g. of 2,3-dihydro-2-phenyl-4H-1,3-benzoxazin-4-one and then heated to 60°. The mixture is cooled to 20°, treated with 12.5 g. of 2-bromoethanol and the mixture heated at 100° for 2 hours. The solvent is evaporated under reduced pressure and the residue treated with 100 ml. of water and 300 ml. of chloroform. The organic layer is separated, washed with 50 ml. of water and dried over magnesium sulfate. Evaporation of the solvent gives a residue of the desired product.

Example 16.—3,4-dihydro-3-(2-hydroxypropyl)-2-phenyl-2H-1,3-benzothiazine

A solution of 25.0 g. of the product of Example 2 in 200 ml. of dry tetrahydrofuran is added dropwise to a suspension of 5.0 g. of lithium aluminum hydride in 100 cc. of dry tetrahydrofuran and the resulting mixture stirred and refluxed for 8 hours. The mixture is cooled, treated with 10 ml. of cold water and a solution of 4 g. of sodium hydroxide in 20 ml. of water, stirred for 2 hours at room temperature, filtered and the inorganic solids washed with ether. The filtrate is dried over magnesium sulfate, filtered and the solvent evaporated to give the product.

Example 17.—2,3-dihydro-3-(4-hydroxy-2-pentyl)-2-phenyl-4H-1,3-benzothiazin-4-one Following the procedure of Examples 1 and 2 but substituting an equivalent amount of 4-aminopentanol for the 3-aminopropanol of Example 1, there is obtained the desired product.

What is claimed is:

1. A therapeutically active compound having the formula

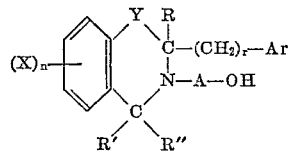

and optical isomers thereof, wherein Ar is selected from the group consisting of phenyl, $(X^1)_n$-substituted phenyl, 3,4 - methylenedioxyphenyl, 3,4 - ethylenedioxyphenyl, furyl, thienyl, napthyl, and pyridyl; R is selected from the group consisting of hydrogen, lower alkyl, phenyl, $(X^2)_n$-substituted phenyl, 3,4-methylenedioxyphenyl, 3,4- ethylenedioxyphenyl, furyl, thienyl, napthyl, and pyridyl; Y is selected from the group consisting of O, S, sulfone and sulfoxide; R' and R" are hydrogen and together R' and R" is oxo; X, $X^1$ and $X^2$ are each selected from the group consisting of hydrogen, lower alkyl, lower alkoxy, amino, di(lower alkyl)amino, halo, lower alkylthio, hydroxy, cyano, nitro, and trifluoromethyl, $n$ is an integer from one to three; $r$ is an integer from zero to three; A is lower alkylene.

2. A compound in accordance with claim 1 wherein Y is sulfur; X and X' are both hydrogen; R' and R" is oxo; and A—OH is hydroxy-lower alkyl.

3. A compound in accordance with claim 1 having the name 2,3 - dihydro - 3 - (3 - hydroxypropyl) - 2 - phenyl-4H-1,3-benzothiazin-4-one.

4. A compound in accordance with claim 1 having the name 2,3 - dihydro - 3 - (3 - hydroxypropyl) - 2 - 4H-1,3-benzothiazin-4-one, dioxide.

5. A compound in accordance with claim 1 having the name 2,3 - dihydro - 3 - (2 - hydroxyethyl) - 2 - phenyl-4H-1,3-benzoxazin-4-one.

6. A compound in accordance with claim 1 having the name 3,4 - dihydro - 3 - (2 - hydroxypropyl) - 2 - phenyl-2H-1,3-benzothiazine.

References Cited

UNITED STATES PATENTS

| | | | |
|---|---|---|---|
| 3,082,209 | 3/1963 | Surrey | 260—243 |
| 3,093,639 | 6/1963 | Surrey | 260—243 |
| 3,149,106 | 9/1964 | Loev | 260—243 |
| 3,155,655 | 11/1964 | Surrey | 260—243 |
| 3,244,704 | 4/1966 | Di Gaudenzio | 260—244 |
| 3,257,396 | 6/1966 | Koo | 260—244 |

HENRY R. JILES, Primary Examiner

JOHN M. FORD, Assistant Examiner

U.S. Cl. X.R.

260—240, 244, 294, 296, 332, 340, 347, 465, 566, 999

PO-1050
(5/69)

UNITED STATES PATENT OFFICE
CERTIFICATE OF CORRECTION

Patent No. 3,459,748    Dated   August 5, 1969

Inventor(s)   John Krapcho

It is certified that error appears in the above-identified patent and that said Letters Patent are hereby corrected as shown below:

Column 1, line 69, "tranffuilizers" should read - - tranquilizers - -.  Column 2, line 37, "(lower alkyl)," should read - - (lower alkyl) - -.  Column 3, line 14, "alkanoyloxy lower" should read - - alkanoyloxy-lower - -; and line 57, "gluonic" should read - - gluconic - -.

SIGNED AND
SEALED
JUL 2 8 1970

(SEAL)
Attest:

Edward M. Fletcher, Jr.
Attesting Officer

WILLIAM E. SCHUYLER, JR.
Commissioner of Patents